Patented Mar. 18, 1941

2,235,057

UNITED STATES PATENT OFFICE 2,235,057

PROCESS FOR THE RECOVERY OF GLYCEROL FROM STILL RESIDUES FROM FERMENTATION PROCESSES

Robert Alan Walmesley, Ardrossan, Scotland, assignor to Imperial Chemical Industries Limited, a corporation of Great Britain No Drawing. Application March 14, 1939, Serial No. 261,856. In Great Britain March 23, 1938

1 Claim. (Cl. 260—637)

The present invention relates to the recovery of glycerol formed during the fermentation of carbohydrate material; and in particular to the recovery of glycerol present in the still residues obtained after highly volatile products, e. g. alcohol, acetone and acetaldehyde, have been distilled from the fermented carbohydrate material. In the following description and claim, the expression "still residues" is to be read as referring to such material.

As various carbohydrate materials are commonly used in fermentation processes, and as the manner of conducting these processes also varies widely, the crude still residues obtained from the different processes cover a wide range of compositions. In all cases, however, the residues contain a large proportion of non-volatile organic matter, chiefly unfermented and/or unfermentable carbohydrates; and in some cases considerable proportions of inorganic substances may also be present.

In addition to the carbohydrate impurities, the residues contain a certain proportion of so-called "acidic" impurities, which appear to consist mainly of phenolic and fatty acid derivatives. These acidic impurities produce undesirable effects in glycerol, and in fermentation glycerol they are present in such proportions that no sample of fermentation glycerol, however pure otherwise, will pass the specification tests applied in most countries to dynamite glycerine intended for use in the manufacture of explosives.

The nature or amount of the organic materials accompanying the glycerol in these still residues has hitherto prevented the successful recovery of the glycerol by the distillation methods which ordinarily serve for the purification of soap-lye or saponification crude glycerines. This is so, even where the material so distilled is not the crude still residue, but the involatile portion of an extract thereof in a volatile solvent for glycerol, e. g. industrial spirits or methyl alcohol, as already proposed for this purpose.

This invention has as an object to devise a new method of extracting glycerol from still residues. A further object is to devise such a method which will be more efficient and economical than previous methods. A still further object is to devise a method of separating glycerol from the materials that accompany it in still residues which will yield a glycerol which may be successfully refined by ordinary distillation processes. Further objects will appear hereinafter. These objects are accomplished by the following invention.

I have found that I can recover the glycerol from still residues and from the impurities contained therein if I include the step of extracting the glycerol-containing liquor, under conditions of low retention of water content, with pyridine or the mixture of pyridine bases commercially available under that description in which glycerol is easily soluble.

The process of my invention may be applied either directly to a still residue, or to a liquor obtained by a preliminary extraction of still residues with a volatile solvent for glycerol, such as methyl or ethyl alcohol, followed by distillation of the extract to recover the volatile solvent therefrom. Where large proportions of inorganic salts are present, a preliminary extract advantageously reduces the quantity of material to be handled in the extraction process. However, the extraction according to the present invention may be effected in some circumstances even in presence of large proportions of inorganic salts.

In putting the invention into effect, I may agitate either the suitably concentrated still residue, or an evaporated alcoholic extract thereof, in a suitable vessel with a suitable quantity of the pyridine, i. e. at least an equal quantity and preferably from three to five times the quantity of glycerol in the liquor. The extraction may be effected at ordinary or raised temperatures, and may be carried out in stages, e. g. in a countercurrent extraction system. I prefer to reduce the water content of the crude liquor below 30% and preferably below 15% before, or in some cases during the extraction; e. g. by distilling off a water-containing volatile fraction from the mixture.

I have found that a very selective extraction of glycerol from non-acidic impurities follows the use of pyridine at ordinary temperature. The quantity of pyridine used is preferably from three to five times the quantity of glycerol in the crude liquor. This method of carrying out the invention has the advantages that glycerol of a high degree or purity can be extracted from the crude liquors by use of relatively small proportions of solvent; e. g. about equal parts by weight of liquor and solvent; and that no preliminary extraction of the crude liquor is necessary. After separation, the extract is fractionally distilled to remove water, separated from any matter precipitated by removal of water, and further distilled to recover the remainder of the volatile solvent.

Alternatively, the solution of glycerol in the pyridine may be mixed with a water-insoluble nitrogenous aromatic base such as aniline or quinoline; and, after removal of the pyridine by distillation, the glycerol solution may be extracted with water, and the aqueous glycerol so obtained may be refined in known manner. Such a process combines in an advantageous manner the highly selective extraction of glycerol by the pyridine bases with the effect of the water-insoluble bases in separating acidic impurities from the glycerol.

The following example illustrates the preferred form of my invention.

Example 1

A fermentation liquor concentrate, containing 14% glycerine and 64% total non-volatile impurity, is agitated at ordinary temperature in a mixing vessel with one and half times it volume (about equal weight) of commercial pyridine added in portions. After thorough admixture, the mixture is allowed to separate, and the upper layer consisting of the pyridine extract is decanted. The residue is mixed and extracted with a second portion of pyridine, the amount used being the same as in the first extraction. The doubly-extracted residue is steamed to recover solvent. The two extracts are transferred to a still arranged for indirect heating with superheated steam, and the liquor is distilled until a sample of the distillate is free from water. The liquor is then allowed to settle and is decanted from the impurities, and the clear portion is further distilled to recover the remainder of the pyridine from it. The residue contains about 95% of the available glycerol in the original liquor, and has a total residue of 20% at 160° C. It can be distilled and clarified in known manner to yield refined glycerine.

Example 2

A fermentation liquor concentrate is extracted with pyridine, as described in Example 1. The settled and depyridinated residue, consisting of a crude glycerol containing about 20% total residue at 160° C. is mixed with ten times its weight of aniline, preferably at a raised temperature. The mixture is then allowed to settle, and the aniline phase is separated, cooled if necessary, and mixed with water to form a 20% solution of glycerol with the glycerol extracted by the aniline. The aqueous glycerol so obtained may be concentrated in the ordinary manner to give a crude glycerol having less than 5% total residue at 160° C. and capable of refinement to 98%–99% refined glycerol grade in a single distillation.

This invention is a valuable advance in the art, giving a simple process whereby 95% or more of the available glycerine in the fermentation liquors can be recovered and with such purity that a double distillation is sufficient to raise the quality of the product to dynamite grade. The process has the advantage of a very low ratio of solvent used to glycerine recovered.

As many apparently widely different embodiments of this invention may be made without departing from the spirit and scope thereof, it is to be understood that the invention is not limited to the specific embodiments thereof except as defined in the appended claim.

I claim:

A process for the recovery of glycerol from still residues and from the impurities contained therein, which comprises the step of extracting a glycerol-containing liquor having a water content of less than 30% with a water-miscible nitrogen-containing base of the class which consists of pyridine and water-miscible pyridine bases, mixing with the solution of glycerol in said base a water-insoluble nitrogenous aromatic base, distilling said water-miscible base therefrom and extracting the glycerol solution with water.

ROBERT A. WALMESLEY.